US011381624B1

(12) United States Patent
Barnett et al.

(10) Patent No.: US 11,381,624 B1
(45) Date of Patent: Jul. 5, 2022

(54) SYSTEM AND METHOD FOR USER VIDEO CHATS WITH PROGRESSIVELY CLEARER IMAGES

(71) Applicant: Zoosk, Inc., Berlin (DE)

(72) Inventors: Eric R. Barnett, Menlo Park, CA (US); Behzad Behrouzi, San Francisco, CA (US); Charles E. Gotlieb, San Francisco, CA (US)

(73) Assignee: Zoosk, Inc., Lehi, UT (US)

( * ) Notice: Subject to any disclaimer, the term of this patent is extended or adjusted under 35 U.S.C. 154(b) by 0 days.

(21) Appl. No.: 17/182,219

(22) Filed: Feb. 22, 2021

Related U.S. Application Data

(63) Continuation of application No. 16/017,947, filed on Jun. 25, 2018, now Pat. No. 10,931,728.

(60) Provisional application No. 62/524,599, filed on Jun. 25, 2017.

(51) Int. Cl.
| G06F 15/16 | (2006.01) |
| H04L 65/60 | (2022.01) |
| G06T 3/40 | (2006.01) |
| G06Q 50/00 | (2012.01) |
| G06T 5/00 | (2006.01) |
| H04L 51/52 | (2022.01) |

(52) U.S. Cl.
CPC ........... *H04L 65/605* (2013.01); *G06Q 50/01* (2013.01); *G06T 3/4092* (2013.01); *G06T 5/003* (2013.01); *H04L 51/32* (2013.01); *G06T 2207/10016* (2013.01); *G06T 2207/30196* (2013.01)

(58) Field of Classification Search
CPC ....... H04L 65/605; H04L 51/32; G06Q 50/01; G06T 2207/10016; G06T 2207/30196
USPC ......................................................... 709/231
See application file for complete search history.

(56) References Cited

U.S. PATENT DOCUMENTS

| 8,601,379 B2 * | 12/2013 | Marks ..................... A63F 13/06 715/706 |
| 8,766,983 B2 * | 7/2014 | Marks ..................... A63F 13/79 345/473 |
| 9,386,270 B2 * | 7/2016 | Griffin .................... H04N 7/147 |
| 10,404,946 B2 * | 9/2019 | Kaus ....................... G06Q 10/02 |
| 2007/0260984 A1 * | 11/2007 | Marks .................... G06F 3/011 715/706 |
| 2007/0268312 A1 * | 11/2007 | Marks ..................... A63F 13/65 345/633 |
| 2011/0179180 A1 * | 7/2011 | Schleifer ............. H04L 65/1069 709/227 |
| 2015/0201162 A1 * | 7/2015 | Griffin .................... H04N 7/15 348/14.07 |
| 2017/0019357 A1 * | 1/2017 | Lee ..................... H04W 12/033 |

* cited by examiner

*Primary Examiner* — Moustafa M Meky
(74) *Attorney, Agent, or Firm* — Innovation Partners LLC; Charles E. Gotlieb

(57) ABSTRACT

A system and method provides a video chat capability where the video portion of the chat is initially impaired, but gets progressively clearer, either as time elapses, or as the users speak or participate with relevant information.

18 Claims, 4 Drawing Sheets

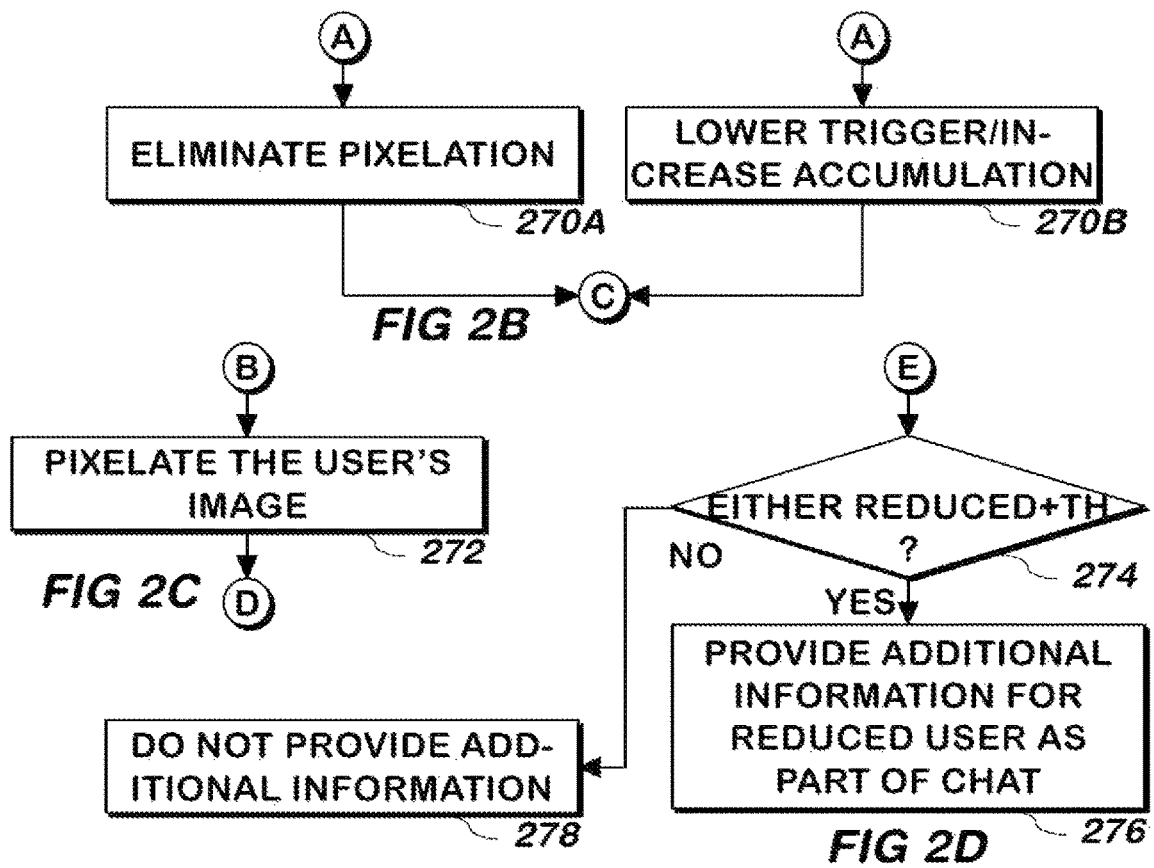
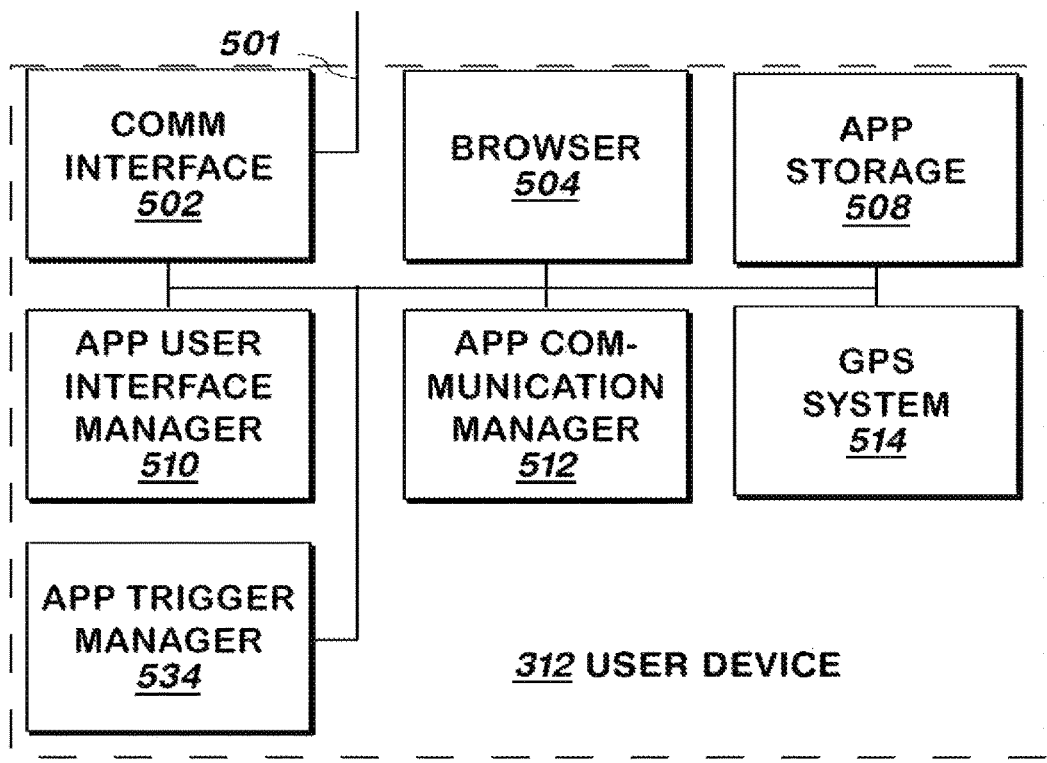

SYSTEM AND METHOD FOR USER VIDEO CHATS WITH PROGRESSIVELY CLEARER IMAGES

RELATED APPLICATIONS

This application is a continuation of U.S. patent application Ser. No. 16/017,947 entitled 'System and Method for User Video Chats With Progressively Clearer Images', filed by Eric R. Barnett, Behzad Behrouzi and Charles E. Gotlieb on Jun. 25, 2018, U.S. Provisional Patent Application Ser. No. 62/524,599 Entitled, "Method and Apparatus for User Video Chats With Progressively Clearer Images" filed on Jun. 25, 2017 by Eric Barnett, Behzad Behrouzi and Charles Gotlieb, each having the same assignee as the present invention, and each is hereby incorporated by reference in its entirety.

FIELD OF THE INVENTION

The present invention is related to computer software and hardware and more specifically to computer software and hardware for video chatting.

BACKGROUND OF THE INVENTION

Conventional video chatting allows users to see and hear the other party. Conventional video chat capabilities are suboptimal. What is needed is a new system and method for video chatting.

SUMMARY OF INVENTION

A system and method enables a video chat session between two or more users of an operator's computer systems that run a web site, app, or both. The servers or apps operating the chat session initially interfere with the video, for example, by pixelating it in each direction, while allowing it to become progressively clearer as the users chat.

The clarity may be improved as a function of time, as a function of participation, or as a function of the use of words relevant to a subject of the chat, that is defined by the party who initiates the chat. Clarity of the images may be improved in both directions simultaneously, or they may be improved at different rates, allowing the party who participates more to see the other user's image faster, for example.

The user initiates a chat by specifying a subject of the chat, and the subject of the chat is displayed to users searching for a chat in which to participate, though no subject need be specified in one embodiment. Other information about the other user may also be displayed, such as a photograph, and the other user's value of a subset of characteristics for which users provide their values, the subset being preselected for all users or being individually selected by each user.

Chats may be unmatched or may be matched to the user's desired characteristics of other users. The match may be mutual or one way and poorly matched users' chats may not be displayed or may be displayed far down the list of chats available to the user searching for one. In one embodiment, the match criteria may be limited to only one or a few characteristics, or may be limited to the one or the few characteristics, plus a small number of deal breaker characteristics selected by each user that identify values of characteristics for other users with which the user wants the system and method to prevent chatting.

The actions of the users during the chat may be used to infer popularity of the user, for example, by identifying which user terminated the chat and when. There may be limits placed on which values of deal breaker characteristics the user may select based on that user's popularity, with the less popular users not being able to be as restrictive with their deal breaker specifications as more popular users.

As described above, the clarity of the images change automatically, with no user input, from not clear (optionally after briefly being clear) to progressively clearer. However, user interface elements such as buttons or the like may be employed to allow the user to perform certain functions, such as immediately or more quickly clearing the image of themselves, or by re-pixelating the image or slowing the rate at which it becomes clearer.

BRIEF DESCRIPTION OF THE DRAWINGS

FIG. 5 is a block schematic diagram of a representative user device of FIG. 3 according to one embodiment of the present invention.

DETAILED DESCRIPTION OF A PREFERRED EMBODIMENT

Figures 1, 2:
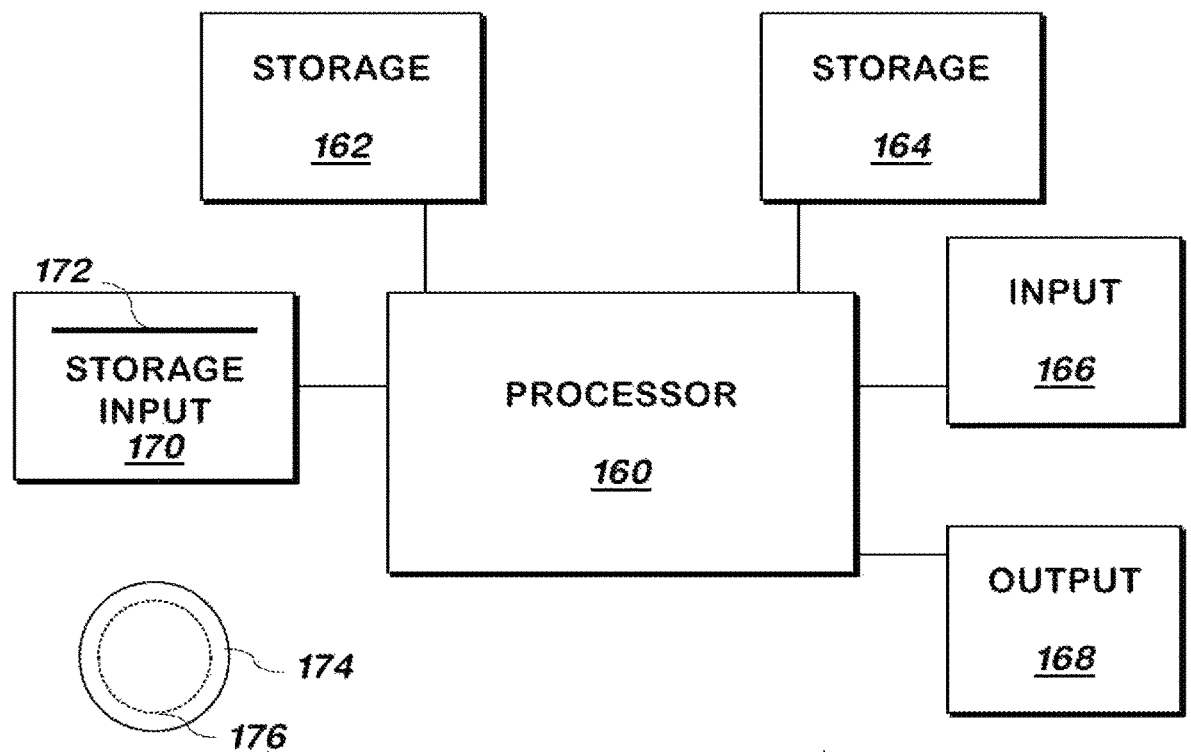
FIG. 1 is a block schematic diagram of a conventional computer system.
FIG. 2, consisting of FIG. 2A, FIG. 2B, FIG. 2C, and FIG. 2D, is a flowchart illustrating a method of facilitating video chats between two or more users of an operator's computer systems that run a web site and/or app according to one embodiment of the present invention.
Figure 2A:
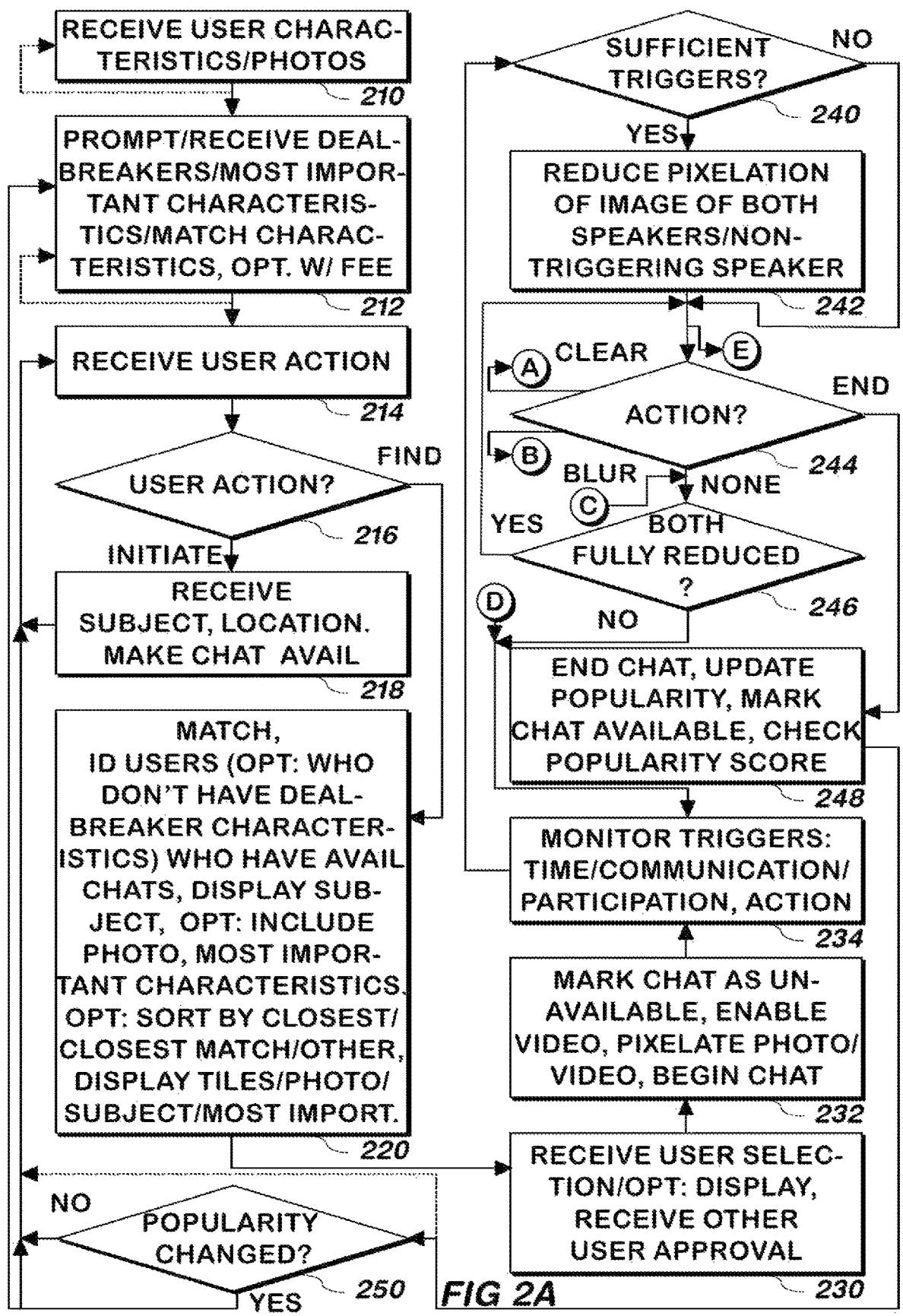

The present invention may be implemented as computer software running on a conventional computer system, computer software embodied on a non-transitory storage media, or otherwise. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein may include conventional memory and/or disk storage and may include a conventional database. All elements of a system include any or all of at least one input, at least one output and at least one input/output. Other system elements may include a conventional processor.

Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS T SERIES SERVER running the ORACLE SOLARIS 11 or higher operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, 7 or 8) commercially available from MICROSOFT Corporation of Redmond Wash. or a Macintosh computer system running the OS X operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a SAMSUNG GALAXY S5 commercially available from SAMSUNG ELECTRONICS GLOBAL of Seoul, South Korea running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

Referring now to FIG. 2, a method of facilitating video chats between two or more users of an operator's computer systems that run a web site and/or app, is shown according to one embodiment of the present invention. User characteristic values for each of several characteristics are received from each of the users 210. User characteristics may include age, gender, height, body type, eye color, hair length, sexual preference, home and work location, etc., and the values may include a value for each characteristic, such as the actual height, color of the user's eyes, etc. The characteristics and their values may be received in a question and answer format, with the user supplying the values or selecting the values from a list, for each of several characteristics. The receipt of characteristics and values may be performed as an independently running process that any number of users may use or update at any time, as indicated by the dashed line in the Figure.

Each user is prompted for, and may also specify 212 match characteristics, i.e. characteristics of other users that user would like to meet. For example, a heterosexual man may specify that they are interested only in heterosexual women, within a certain age range and within a certain geographic distance from their home or office or their current location with certain characteristic values.

In one embodiment a user is prompted for, and can specify 212 a limited number of deal breaker characteristics and values. The limit may be one or two such characteristics. In one embodiment, the values the user may specify may be limited to extreme values or values based on the user's own characteristics. For example, a woman may be only able to specify men who are very short, shorter than herself, or shorter than her height plus an amount, such as two or four inches. The values the user may specify may be provided as a function of the popularity of the user, with more popular users being able to specify a less restrictive range of values than a less popular user.

Popularity may be identified by the percentage of people who investigate the user's profile after viewing a summary of their profile, or the percentage of people who message the user after viewing their profile, with people whose profiles are investigated more or who are messaged more being considered more popular. In one embodiment, popularity is, or is also, determined by the percentage of chats that are not terminated by the other user until a threshold amount of time after their image is fully revealed to the other user of the chat.

As described in more detail below, the deal breaker characteristic values may be, or may be required to be, updated as the user's measured popularity changes if the user's deal breaker characteristic values would not have been presented to the user given their newly calculated popularity. Thus, a women may initially specify that the user must be at least 6 feet tall, but if the woman's popularity is determined to be very low, the woman may be required to update the value of that deal breaker, with the 6' tall or above option not made available to her, with options that apply to a larger number of people remaining available, so that the user can select 5'8" and above, for example.

In one embodiment, a fee is required to specify any or all of match characteristics, deal breakers, or particularly restrictive deal breakers that only apply to a small number of people, such as ten percent or fewer, as part of step 212.

At any time, any number of users may provide an indication of an action they wish to take and such action is received 214. If the user action is to initiate a new chat 216, a chat subject, which the user may select from a list or identify a different subject not on the list, and user's location are received 218. In one embodiment, the user may leave the subject blank to indicate the subject of the chat is open. The user's location is also received as part of the request. The location may be the location of a mobile device from which the request was received if a specially programmed app is used to make the request, identified using the GPS capabilities of the device, or may be the user's home or work specified location if the action is received via a web interface. The chat is marked as available as part of step 218. The method continues at step 214.

At any time, any number of users may request to find initiated chats with which to participate. In one embodiment, only two users participate in any chat, though other numbers of users may be used in each chat. Any number of chats may be active at any time. If the user action in step 214 is a request to find an initiated chat, initiated chats marked as available, and meeting a criteria, are identified and displayed to the user who made the request 220. The display may be in the form of a tile for each such initiated chat, i.e. different colored boxes.

The tiles may display information, such as any or all of the subject of the chat (if one was specified), a small photograph of the user, and the value of the values of the user who initiated the chat of the most important characteristics defined by the user who requested to find chats.

The criteria used to filter the chats may include some or all of each user's match criteria, such as distance between the user and the user who initiated the chat, sex and sexual orientation, and any 'other criteria' the users specified, although in one embodiment, only the users' sex, sexual orientation, and distance are used. In one embodiment, the match is mutual (meaning the user will not see tiles of chats if either user does not meet the other's match criteria), and in other embodiments, the match is only made for one user: ether the user finding initiated chats or the user who initiated the chat. In one embodiment, each user's deal breaker criteria are used in place of the 'other criteria' or in addition to it, or no other criteria or deal breakers may be used in still other embodiments.

Distance may be measured from either user's home or work location or the nearest one to the other user, or the current location of the user's mobile device if a user is using an app a mobile device.

In one embodiment, the tiles are sorted by closest match, for one or both users and displayed in sorted order. In another embodiment, tiles are sorted by the distance between the users and in another embodiment, a combination of all of these factors are used.

The user may select a chat, for example by moving a mouse cursor over the tile corresponding to the desired chat and clicking on the tile or tapping the tile corresponding to the user's desired chat and such selection is received 230. In one embodiment, the user who initiated the chat is notified that the user has selected their chat, and information about the other user is displayed to the user who initiated the chat, such as a small photograph of the user who selected the chat and the values of the user who made the selection of the most important characteristics of the user who initiated the chat. If the user who initiated the chat approves the user who selected the chat, the method continues at step 232 and otherwise, the user who selected the chat is informed that the user who initiated the chat is unavailable and the user who selected the chat may select another chat. In another embodiment, no such approval is required and step 232 follows step 230 unconditionally.

At step 232, the chat is marked as unavailable (e.g. by unmarking it as available) and a video chat session between the two users (the user who selected the chat and the user who initiated the selected chat) is initiated that includes both audio and video of each user transmitted to the other. However, the video is initially heavily pixelated, making each of the two users initially unrecognizable. Although pixelation is used, other methods of interfering with the video and making it clearer, either progressively or all at once, such as by darkening it and making it progressively lighter, or blurring it and making it progressively clearer may be used. The camera of each user is pointed at that user and each user sees the video image of the other user and hears audio of the other user, as part of the chat. The small photograph of the other user may also be displayed to each user, at least until the video is displayed at maximum clarity. The user may see a small version of his or her own video image, pixelated as the other user sees it.

In one embodiment, the image of each user is clear, and then quickly (under a second) heavily pixelated instead of starting heavily pixelated.

To pixelate the video, the screen is divided into a number of regions (which may be equal sized or approximately equal sized) and one pixel is selected from each region, for example, from the center of the region. That color pixel is displayed throughout the entire region in place of the color of the pixels in the region. To heavily pixelate the video, a small number of regions may be identified, such as 20, though other numbers may be used. Audio is not altered by the pixelation and the users can communicate using the audio capability of the chat, though what they see will be heavily pixelated. Pixelation occurs on the app on the user's device or on a server. If the pixilation occurs on the server, an unpixellated sequence of images is received by the server from a camera of the device or computer system used by one user, pixelated by the server, and the pixelated version is provided to the other user. If the pixilation occurs on the device, the clear image may be transmitted to the other user via the server and the app on the receiving device pixelates the image under control of the server that monitors the triggers, or using its own monitoring of the triggers, or the sending app may perform the pixilation, either under control of the server that monitors the triggers or by monitoring the triggers itself. A microphone of the device or computer system transmits audio, which is forwarded to the other user as part of the chat.

One or more triggers are monitored 234 during the chat. One trigger is elapsed time, for example using an operating system timer of the server. Another trigger is any audio received from each user. Still another trigger may be words used in the chat that relate to the subject. The words may be recognized using conventional speech recognition techniques and compared to a list of words that correspond to the subject of the chat, for example, by searching web sites using the subject of the chat, identifying uncommon words, and awarding a point for every such word used. Other triggers may be words spoken with a voice tone and/or inflection that indicates interest. The triggers may be monitored for both users (i.e. the method does not distinguish from which user the trigger was received) or, in the case of time, the trigger monitored operates for both users. User action, with respect to user interface elements displayed as part of the chat or as an option to it, may also be monitored as part of step 234.

As the monitored triggers are received they are logged as part of step 234. If a sufficient number or amount of triggers has been received 240, the pixilation of the image received by the user or users that achieved such sufficiency is reduced 242. For some triggers, such as time, a sufficient number of triggers is one unit of time, such as 30 seconds or one minute, two minutes or a different amount of time. For other triggers, for example, speaking time, the amount of time each user speaks is cumulated and a sufficient number of triggers may be 20 seconds.

To reduce pixilation, the number of regions to use for the pixilation process may be increased, for example, by dividing each region into four regions and pixelating as described above, using the new, higher number of regions, so that the image seen by the other user will become progressively closer to the image provided by the user.

At any time, the user may perform a user action. One such user action is to operate a user interface element, such as a button, displayed with the chat, to end the chat. After step 242, or if insufficient triggers have been received 240, if the user does not perform an action 244, if the pixilation for both images is fully reduced to a minimum effect, such as each region contains only one pixel 246, the method continues at step 244. If the pixilation is not fully reduced for both images 246, monitoring continues at step 234.

In one embodiment, when the pixilation of a user's image is fully reduced, plus optionally a threshold amount of time 274, the other user will see additional information about the user whose image is clear as part of the video chat 276 and otherwise 274, the additional information is not provided 278, although in other embodiments it may be provided or different additional information may be provided. Such other information may include photos of the user provided at step 210 and characteristic information of the user. The characteristic information may appear scrolling across the bottom of the screen, for example, and the photos may be displayed around the user's video image, which may be reduced in size, or may be occasionally displayed in place of the video image of the user.

If a user elects to end the chat 244, the chat is ended and marked as available and the users popularity scores are updated 248 and checked to determine whether the user's popularity score has moved into a different threshold, up or down. The popularity score of a user is a measure of the user's popularity as described herein. In one embodiment, if the image is at minimum pixilation (i.e. maximum clarity) for at least a threshold amount of time before the chat is ended, the users' popularity scores are increased, or in one embodiment, the popularity score of the user with the lower popularity score is increased, at step 248. If the chat is ended before the threshold amount of time but after the image is at minimum pixilation, the popularity score of the user who did not end the chat may be decreased by a first amount, and if the chat is ended before the pixilation is at minimum, the popularity score of the user who did not end the chat may be decreased by a second, different, amount, which may be higher or lower than the first amount. The popularity score may only be reduced in each instance if the user ending the chat has a higher popularity score than the other user in one embodiment, or only if the user ending the chat has a lower popularity score than the other user in another embodiment. The method continues at step 250.

If the popularity score has changed to place the user into a lower range of scores for which one or more of the user's deal breaker values would not be acceptable, or to place the user into a higher range and the user's deal breaker value was at the edge of allowable values that have expanded based on the user's new popularity score 250, the method continues at steps 214 and/or 212, and otherwise 250, the method continues at step 214. In another embodiment, only step 212 follows step 248, and does so unconditionally, as indicated by the dashed line in the Figure. The user may, however, change their deal breaker values at any time, and may discover the values available to the user have changed. In one embodiment, if the user has a popularity score for which a deal breaker value selected by the user would not have been allowed if the user had had the score when the value was selected, the closest allowed deal breaker value is used for the user instead, either by the server changing it at step 248, or by using in step 220 the more restricted allowed value nearest the one the user selected.

If the action is the user using a user interface element displayed with the chat to elect to clear the image he or she generates 244, in one embodiment, the image sourced by that user is cleared, for example, by reducing the pixilation of the image to the minimum value immediately 270A monitoring of the triggers is ended for that image and the method continues at step 246. In one embodiment, the operation of the user interface element does not clear the image immediately, but causes the image of that user to clear more quickly, for example, by reducing the value of the trigger required to cause the image to be successively cleared, or by increasing the effect of the trigger so that, for example, only 5 words are required to be spoken instead of ten. In such embodiment 270B, and the method continues at step 246.

In one embodiment, the user may reblur the image they source using a user interface element displayed with the chat. If the action is to blur the image, the image sourced by that user has it's pixilation increased, for example to a higher value or the maximum value 272, and the method continues at step 234.

System.

Figure 3:
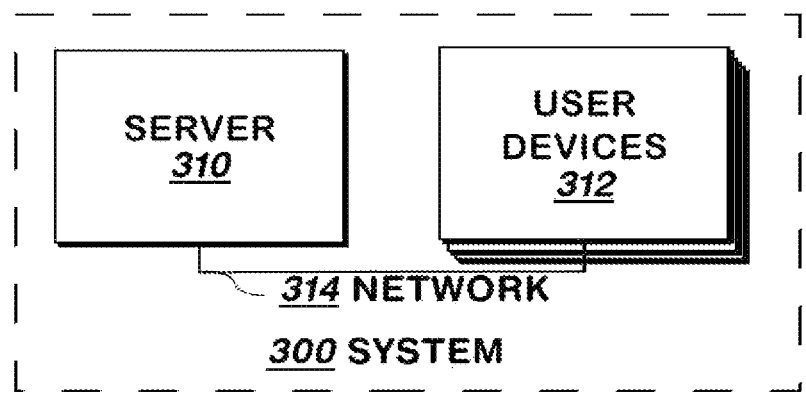
FIG. 3 is a block schematic diagram of a system for facilitating video chats between two or more users of an operator's computer systems that run a web site and/or app, including a server and two or more user devices according to one embodiment of the present invention.

Referring now to FIG. 3, a system for facilitating chats between two or more users of an operator's computer systems that run a web site and/or app is shown according to one embodiment of the present invention. System 300 includes server 310 which includes one or more conventional servers, each with at least one processor specially programmed to perform as described herein. Server 310 is configured as a chat server to operate as described herein. Server 310 is coupled via network to any number of user devices 312, which include conventional personal computer systems, or smart devices such as smart phones or tablets, optionally with an app downloaded that include at least one processor specially programmed to operate as described herein. The user may use a user device 312 to communicate with server 310 via a conventional web browser, which is how the system will be initially described, or may use an app on device 312 if the device includes a smart device.

Figure 4:
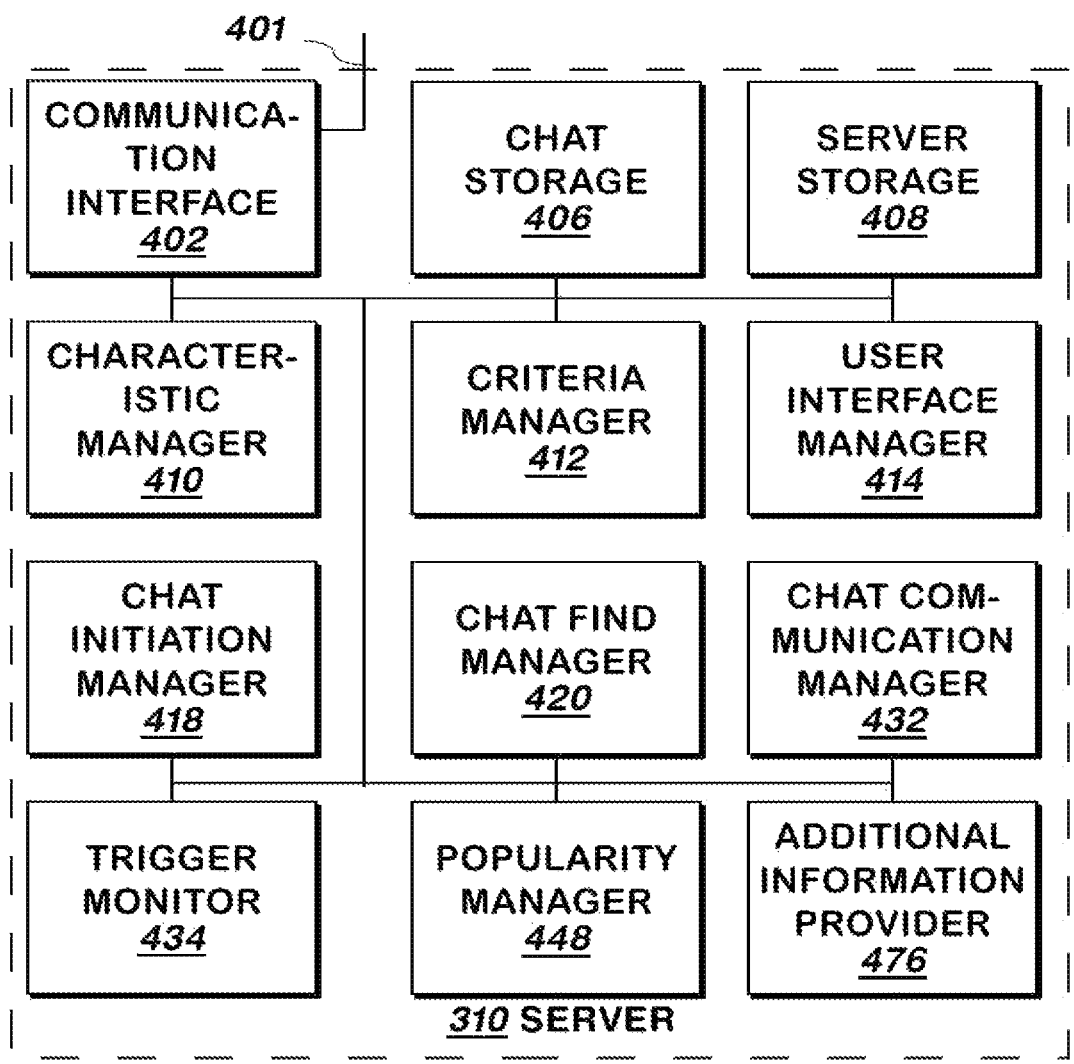
FIG. 4 is a block schematic diagram of a server of FIG. 3 according to one embodiment of the present invention.

Server 310 is shown in more detail in FIG. 4. A representative smart device, making up one or more of user devices 312, is shown in more detail in FIG. 5. Server 310 includes a conventional communication interface 402, such as a TCP/IP-compatible communication interface running suitable communication protocols, such as TCP/IP, Ethernet or others and is coupled to network 314 via input/output 401. Each device 312 includes a conventional communication interface 502, such as a TCP/IP-compatible communication interface running suitable communication protocols, such as TCP/IP, Ethernet, cellular communication protocols, or others and is coupled to network 314 via input/output 501. Network 314 may include a conventional Ethernet network, the networks that make up the Internet, cellular communication networks, or any or all of these. Unless otherwise specified, all communication into or out of server 310 is made via communication interface 402 and all communication into or out of any device 312 is made via communication interface 502.

Characteristic manager 410 receives characteristics as described above from users and stores them associated with a user identifier of the user in server storage 408, which may include memory or disk storage and may include a conventional database. Criterial manager 412 receives deal breakers, most important characteristics and match criteria as described above and stores them into server storage associated with a user identifier of the user.

User interface manager 414 provides user interfaces to the user and allows the user to select, and then log in via, a username and password, which it stores in server storage 408. User interface manager 414 may provide user device 312 with a cookie including an identifier of the user, once the user has successfully logged in. User interface manager 414 provides user interface elements such as buttons or links that signal characteristic manager 410 or criteria manager 412 with the identifier of the user (or any such elements of server 310 may retrieve the cookie to identify the user). Characteristic manager 410 or criteria manager 412 then provide the user interfaces that prompt the user for the information. When the user has finished providing such information, the user uses a user interface element on the web page that submits the information to the element on the server that supplied the user interface and signals user interface manager 414, which provides a user interface allowing the user to perform the actions described herein.

If an app is used, the information flow and user interface elements the user uses are provided by app user interface manager 510, which provides the information and an identifier of the user to characteristic manager 410 or criteria manager 412, which store the information as described herein. The user can set up an account or log into the system via app user interface manager 510, which provides the user identifier and password to user interface manager 414 which either stores them into server storage 408 (if the account is being set up) or checks them, generates and stores a unique session identifier into server storage 408 and provides the session identifier to app user interface manager 510 which stores it and uses it to identify the user during the session. All information flows from its source to its destination in any manner to provide the functions of the present invention.

User interface manager 414 also provides user interface elements such as buttons or links that receive requests to initiate chats or find chats. If the user requests to initiate a chat, user interface manager 418 signals chat initiation manager 418 which requests the subject of the chat and stores it into chat storage 406, which may be memory or disk storage and may include a conventional database, associated with a unique identifier it generates and stores in chat storage, along with the user identifier of the user who initiated the chat.

If the user is using an app, app user interface manager 510 receives the information from the user, retrieves the GPS coordinates of the device on which the app is running from GPS system 514, and provides the information received from the user, the user identifier (i.e. the session identifier) and the coordinates to chat initiation manager 418, which operates as described above. GPS system 514 is a conventional GPS system of a smart device that obtains the GPS signals and identifies the coordinates of the device using the GPS signals or other information it may receive.

If the user wishes to find a chat with which to participate, the user uses a user interface element supplied by user interface manager 414 to so indicate, and user interface manager 414 signals chat find manager 420.

When signaled, chat find manager 420 identifies chats and sorts them as described above and provides to the user, user interface elements such as tiles with clickable regions as described above, using the information in chat storage 406 and server storage 408. The user may select one of the chats corresponding to the user interface elements and if one is selected, chat find manager 420 provides its identifier and the user identifier to chat communication manager 432.

If the user is using an app, app user interface manager 510 obtains the GPS coordinates of the device from GPS system 514, provides the coordinates and user identifier to chat find manager 420, which finds the chats as described above and app user interface manager 510 receives the information to appear on the tile, and the chat identifier, for each chat to be displayed to the user and displays the tiles with the information to appear on the tile. Such information may be received for chats, one set (e.g. 20 per set) at a time, and as the user scrolls down the tiles, app user interface manager 510 requests such information for another set of tiles from chat find manager 420, and such information is retrieved by chat find manager 420 and provided to app user interface manager 510 for display to the user on the touch screen of the smart device. When the user makes a selection, the chat identifier are provided by app user interface 510 to chat find manager 420, and chat find manager 420 provides them to chat communication manager 432.

When it receives such identifiers, chat communication manager 432 associates in chat storage 406 the user identifier it receives with the chat identifier, and sets up and maintains a conventional video chat session, including video and audio with the users' browsers 504 if the user is using a browser, or with app communication manager 512 in each device if the user is using an app running on a mobile device.

Any or all of chat communication manager 432, app communication manager 512 or browser 404 may handle the pixilation or other clarity obscuring features described herein, and will thus display the video signal or cause the video signal to be displayed at maximum obscurity, optionally after a short delay during which the picture is at a minimum of obscurity. The video of each user from a camera (not shown) coupled to their user device 312, may be displayed (and audio provided) to the other user or users of the chat directly by such elements, alongside user interface elements provided by user interface manager 414 or app user interface manager 510, or the video and audio may be provided to user interface manager 414 or app user interface manager 510 for rendering to the user via the browser or via the device by user interface manager 414 or app user interface manager 510, which also display user interface elements (i.e. controls such as buttons) that allow users to perform the actions during the chat as described herein.

Additionally, chat communication manager 432 signals trigger monitor 434 or, in one embodiment, app trigger monitor 534 (if an app is used, though the apps may use trigger monitor 434 instead) to begin monitoring the chat session as described herein.

Trigger monitor 434 or app trigger monitor 534 monitors the time and/or audio from the chat as described herein and as sufficient triggers are received as described herein, they signal communication manager 432, app communication manager 512 or browser 404 to lessen the obscurity of the image as described herein, and such element that is performing the obscuring complies as described above.

As noted, obscuring may be performed by pixilation, or other methods, and may be performed by either or both app communication managers 512 of the users. If performed by both, it may be performed by the originating or receiving or both app communication manager 512. In such case, if both the app trigger monitors 534 are used, they each monitor the time or the appropriate communication stream or both communication streams. In the case of identifying words, such words are identified as described above by chat initiation manager 418 using the subject of the chat, stored in chat storage 406 and obtained or provided to the entity that monitors the chat when the chat begins.

If the user can see his or her own image obscured, the entity monitoring the appropriate communication stream signals the entity or entities obscuring that sequence of video images, or all entities monitoring communication streams may monitor both streams and signal one or both entities obscuring the sequences of images that make up the video.

Once obscuring is at the minimum value, the element or elements that are obscuring the image, communication manager 432, app communication manager 512 or browser 404, signal the element or elements monitoring the chat, trigger monitor 434 or app trigger monitor 534 to stop monitoring the time or that portion of the audio that affects the image that is un obscured, and such elements comply.

User interface manager 414 or app user interface manager 510 supplies user interface elements to do none, some or all of: end the chat, re-obscure the image or remove the obscuring of the image.

If the user operates the user interface element to remove obscuring of their image, user interface manager 414 or app user interface manager 510 so indicates to the element or elements obscuring their image and that element complies or those elements comply, and also initiate the end of monitoring of the chat for that sequence of images as described above. If the image was not obscured due to the triggers as described herein, the element or one of the elements that had been obscuring it so indicates to user interface manager 414 or app user interface manager 510, which removes the user interface element allowing the image to be un-obscured.

If the user uses the user interface element to re-obscure their image, user interface manager 414 or app user interface manager 510 so indicates to the element or elements which had been obscuring that image, and such element or elements complies by re obscuring the image to its maximum value. If the image had been unobscured, one or both such elements signals trigger monitor 434 or app trigger monitor 534, which resumes the monitoring process so that the obscuring will be reduced over time as described above.

In one embodiment, when a video stream reaches maximum clarity, the element that had been obscuring to the other user optionally sets a timer and then after the timer elapses, or substantially immediately after the video stream has reached maximum clarity if no timer is to be used, signals additional information provider 476 with the identifier of the chat and the identifier of the user to whom the video was being displayed. In the user is using an app, app communication manager 412 obtains such information from chat communication manager 432 at the start of the chat if app communication manager 432 will obscure the image or images. Additional information provider 476 provides the additional information described above for the other user associated with the chat to chat communication manager 432, which retrieves from server storage 408 and inserts into the chat video stream it supplies for display to the user, the additional information described above. In one embodiment, the additional information includes photographs supplied by such other user to characteristic manager 410, which it stores in server storage 408, as well as text of values of characteristics of such other user or other information the other user may supply for this purpose.

If the user elects to end the chat, the user selects the corresponding user interface control, and app user interface manager 512 or user interface manager 414 receives the indication that the user interface control has been operated and signals chat communication manager 432 to end the chat, with the identifier of the user who ended the chat. Chat communication manager 432 stops the chat and signals app communication manager 512 and app trigger monitor 534 in both apps, which return control to app user interface manager 510, or signals user interface manager 414 and trigger monitor 434 (and optionally browser 504) and the chat is no longer displayed nor monitored. In the case of an app, if the obscuring of the image is performed by app communication manager 512, each app communication manager 512 in use indicates to chat communication manager 432 whether the obscuring of the image is at its minimum value, and if so, for how long.

Chat communication manager 432 signals popularity manager with the identifier of the user who ended the chat, indications as to whether the obscuring of each the images was at the minimum and if so, for how long, and popularity manager 448 retrieves the user's popularity scores from server storage 408, updates them as described above, and stores them into server storage 408. Popularity manager 448 optionally checks the deal breaker values of any user whose score has moved past a threshold that would not allow a selected value or would allow a different value that had not previously been allowed for which the value selected was at the edge of the allowable range, and signals user interface manager 414 or app user interface manager 510, in such case, which allow or require the user to change the value or values as described above.

As described herein, the video stream of a user may be referred to as its "image". The video stream gets progressively clearer without any user input explicitly directing such clearing to occur.

Certain Embodiments.

Described is a method of displaying a chat session, including:

receiving a subject of the chat session from a first user;

displaying the subject of the chat session to two or more second users who meet at least one criteria of the first user;

receiving an indication from one of the two or more second users that said second user wishes to join the chat session;

enabling communications for the chat session between the first user and the second user from which the indication was received, the communications of the chat session including a video component in each of at least two directions of the chat session;

providing an obscuring effect to the video component of the chat session to obscure the video component in at least one of the two directions of the chat session;

detecting in succession two or more triggers; and removing some of the obscuring from the video component in at least one of the two directions upon the detecting of two or more the two or more triggers, so that the video component in the at least one direction of the chat session becomes progressively clearer and clearer.

The method may contain additional features, whereby each of the two or more triggers comprises an elapsed time from a prior trigger.

The method may contain additional features, whereby at least some of the two or more triggers comprises participation in the chat session.

The method may contain additional features, whereby the removing of some of the obscuring from the video component is performed in only one of the two directions upon detecting each of the two or more triggers.

The method may contain additional features, whereby, for each trigger, the one direction is the video component received by the first user or second user whose participation in the chat comprised the trigger.

The method may contain additional features, whereby, for each trigger, the one direction is the video component provided by the first user or second user whose participation in the chat comprised the trigger.

Described is a system for displaying a chat session, including:

a chat initiation manager having an input for receiving a subject of the chat session from a first user, the chat initiation manager for providing at an output the subject of the chat session;

a chat find manager having an input coupled to the chat initiation manager output for receiving the subject of the chat, the chat find manager for providing at an output for display the subject of the chat session to each of two or more second users who meet at least one criteria of the first user, and receiving at the chat find manager input an indication from one of the two or more second users that said second user wishes to join the chat session, the chat find manager for providing at the chat find manager output an identifier of the one of the two or more second users;

a chat manager having an input coupled to the chat find manager for receiving the identifier of the one of the two or more second users, the chat manager for enabling via an input/output communications for the chat session between the first user and the second user from which the indication was received, the communications of the chat session including a video component in each of at least two directions of the chat session, and for providing an obscuring effect to the video component of the chat session to obscure the video component in at least one of the two directions of the chat session;

a trigger monitor for detecting in succession two or more triggers and providing at an output an indication of each of the two or more triggers; and wherein the chat manager input is additionally coupled to the trigger monitor for receiving the indication of each of the two or more triggers, and the chat manager is additionally for removing some of the obscuring from the video component in at least one of the two directions in response to receiving each of two or more the two or more the two or more triggers, so that the video component in the at least one direction of the chat session becomes progressively clearer and clearer.

The system may contain additional features, whereby each of the two or more triggers comprises an elapsed time from a prior trigger.

The system may contain additional features, whereby:

the chat manager provides information from the chat session at the chat manager output;

the trigger monitor input is coupled to the chat manager output for receiving the information from the chat session, and at least some of the two or more triggers comprises participation in the chat session.

The system may contain additional features, whereby the removing of some of the obscuring from the video component is performed in only one of the two directions upon detecting each of the two or more triggers.

The system may contain additional features, whereby:

the information from the chat session identifies the first user or the one of the two or more second users;

the trigger monitor additionally provides at the trigger monitor output an identifier of the first user or the second user to which each of the two or more triggers corresponds;

the chat manager input is additionally for receiving the identifier for each of the two or more triggers; and for each trigger, the one direction is the video component received by the first user or second user whose participation in the chat comprised the trigger.

The system may contain additional features, whereby:

the information from the chat session identifies the first user or the one of the two or more second users;

the trigger monitor additionally provides at the trigger monitor output an identifier of the first user or the second user to which each of the two or more triggers corresponds;

the chat manager input is additionally for receiving the identifier for each of the two or more triggers; and for each trigger, the one direction is the video component provided by the first user or second user whose participation in the chat comprised the trigger.

Described is a computer program product including a non-transitory computer useable medium having computer readable program code embodied therein for displaying a chat session, the computer program product including computer readable program code devices configured to cause a computer system to:

receive a subject of the chat session from a first user;

display the subject of the chat session to two or more second users who meet at least one criteria of the first user;

receive an indication from one of the two or more second users that said second user wishes to join the chat session;

enable communications for the chat session between the first user and the second user from which the indication was received, the communications of the chat session including a video component in each of at least two directions of the chat session;

provide an obscuring effect to the video component of the chat session to obscure the video component in at least one of the two directions of the chat session;

detect in succession two or more triggers; and remove some of the obscuring from the video component in at least one of the two directions upon the detecting of two or more the two or more triggers, so that the video component in the at least one direction of the chat session becomes progressively clearer and clearer.

The computer program product may contain additional features whereby each of the two or more triggers comprises an elapsed time from a prior trigger.

The computer program product may contain additional features, whereby at least some of the two or more triggers comprises participation in the chat session.

The computer program product may contain additional features, whereby the computer readable program code devices configured to cause the computer system to remove some of the obscuring from the video component is performed in only one of the two directions upon detecting each of the two or more triggers.

The computer program product may contain additional features, whereby, for each trigger, the one direction is the video component received by the first user or second user whose participation in the chat comprised the trigger.

The computer program product may contain additional features, whereby, for each trigger, the one direction is the video component provided by the first user or second user whose participation in the chat comprised the trigger.

Each system element may include a conventional hardware processor or hardware processor system or processor system or processor that is coupled to a hardware memory or hardware memory system or memory or memory system, each of these being conventional in nature. All system elements are structural: the only nonce word to be used herein is "means". Each system element described herein may include computer software or firmware running on a conventional computer system. Each system element labeled "storage" may include a conventional computer storage such as memory or disk and may include a conventional database. Each system element may contain one or more inputs, outputs and/or input/outputs to perform the functions described herein. Any system element may incorporate any of the features of the method and vice versa.

What is claimed is:

1. A method of displaying a chat session, comprising:

enabling communications for the chat session between a first user and a second user, the communications of the chat session comprising a video component in each of at least two directions of the chat session;

providing an obscuring effect to the video component of the chat session to obscure the video component in at least one of the two directions of the chat session;

detecting in succession a plurality of triggers; and removing some of the obscuring effect from the video component in at least one of the two directions upon the detecting of at least one of the plurality of triggers, so that the video component in the at least one direction of the chat session becomes progressively clearer and clearer.

2. The method of claim 1, wherein each of the plurality of triggers comprises an elapsed time from a prior trigger.

3. The method of claim 1, wherein at least some of the plurality of triggers comprises participation in the chat session.

4. The method of claim 3, wherein the removing of the some of the obscuring effect from the video component is performed in only one of the two directions upon detecting each of the plurality of triggers.

5. The method of claim 4, wherein, for each trigger, the at least one direction comprises the video component received by the first user or the second user whose participation in the chat session comprised the trigger.

6. The method of claim 4, wherein, for each trigger, the at least one direction comprises the video component provided by the first user or the second user whose participation in the chat session comprised the trigger.

7. A system for displaying a chat session, comprising:
a chat manager having an input for receiving an identifier of one of a plurality of second users, the chat manager for enabling via an input/output communications of the chat session between a first user and the second user, the communications of the chat session comprising a video component in each of at least two directions of the chat session, and for providing an obscuring effect to the video component of the chat session to obscure the video component in at least one of the two directions of the chat session;
a trigger monitor for detecting in succession a plurality of triggers and providing at an output an indication of each of the plurality of triggers; and
wherein the chat manager input is additionally coupled to the trigger monitor for receiving the indication of each of the plurality of triggers, and the chat manager is additionally for removing some of the obscuring effect from the video component in at least one of the two directions in response to receiving each of at least one of the plurality of the plurality of triggers, so that the video component in the at least one direction of the chat session becomes progressively clearer and clearer.

8. The system of claim 7, wherein each of the plurality of triggers comprises an elapsed time from a prior trigger.

9. The system of claim 7, wherein:
the chat manager provides information from the chat session at a chat manager output;
a trigger monitor input is coupled to the chat manager output for receiving the information from the chat session, and at least some of the plurality of triggers comprise participation in the chat session.

10. The system of claim 9, wherein the removing of some of the obscuring effect from the video component is performed in only one of the two directions upon detecting each of the plurality of triggers.

11. The system of claim 10, wherein:
the trigger monitor additionally provides at the trigger monitor output an identifier of the first user or the second user to which each of the plurality of triggers corresponds;
the chat manager input is additionally for receiving the identifier for each of the plurality of triggers; and
for each trigger, the at least one direction comprises the video component received by the first user or second user whose participation in the chat comprised the trigger.

12. The system of claim 10, wherein:
the information from the chat session identifies the first user or the one of the plurality of second users;
the trigger monitor additionally provides at the trigger monitor output an identifier of the first user or the second user to which each of the plurality of triggers corresponds;
the chat manager input is additionally for receiving the identifier for each of the plurality of triggers; and
for each trigger, the at least one direction comprises the video component provided by the first user or second user whose participation in the chat comprised the trigger.

13. A computer program product comprising a non-transitory computer useable medium having computer readable program code embodied therein for displaying a chat session, the computer program product comprising computer readable program code devices configured to cause a computer system to:
enable communications for the chat session between a first user and a second user, the communications of the chat session comprising a video component in each of at least two directions of the chat session;
provide an obscuring effect to the video component of the chat session to obscure the video component in at least one of the two directions of the chat session;
detect in succession a plurality of triggers; and
remove some of the obscuring effect from the video component in at least one of the two directions upon the detecting of at least one of the plurality of triggers, so that the video component in the at least one direction of the chat session becomes progressively clearer and clearer.

14. The computer program product of claim 13, wherein each of the plurality of triggers comprises an elapsed time from a prior trigger.

15. The computer program product of claim 13, wherein at least some of the plurality of triggers comprises participation in the chat session.

16. The computer program product of claim 15, wherein the computer readable program code devices configured to cause the computer system to remove some of the obscuring effect from the video component is performed in only one of the two directions upon detecting each of the plurality of triggers.

17. The computer program product of claim 16, wherein, for each trigger, the one direction is the video component received by the first user or the second user whose participation in the chat session comprised the trigger.

18. The computer program product of claim 16, wherein, for each trigger, the one direction is the video component provided by the first user or the second user whose participation in the chat session comprised the trigger.

* * * * *